(12) United States Patent
Yadav

(10) Patent No.: US 12,272,836 B2
(45) Date of Patent: Apr. 8, 2025

(54) BATTERY PACK WITH TEMPERATURE-CONTROLLED VENT GAS FLOW

(71) Applicant: GM GLOBAL TECHNOLOGY OPERATIONS LLC, Detroit, MI (US)

(72) Inventor: Anil Yadav, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 560 days.

(21) Appl. No.: 17/846,152

(22) Filed: Jun. 22, 2022

(65) Prior Publication Data
US 2023/0420791 A1    Dec. 28, 2023

(51) Int. Cl.
| | |
|---|---|
| H01M 50/333 | (2021.01) |
| B60L 50/64 | (2019.01) |
| B60L 58/26 | (2019.01) |
| H01M 10/0525 | (2010.01) |
| B60L 50/60 | (2019.01) |

(52) U.S. Cl.
CPC ........... *H01M 50/333* (2021.01); *B60L 50/64* (2019.02); *B60L 58/26* (2019.02); *H01M 10/0525* (2013.01); *B60L 50/66* (2019.02); *B60L 2240/545* (2013.01); *H01M 2220/20* (2013.01)

(58) Field of Classification Search
None
See application file for complete search history.

(56) References Cited

U.S. PATENT DOCUMENTS

2019/0181419 A1\*   6/2019   Suba ................. H01M 10/0525

\* cited by examiner

*Primary Examiner* — Wyatt P McConnell
(74) *Attorney, Agent, or Firm* — Quinn IP Law

(57) ABSTRACT

A battery pack includes one or more battery modules subject to generating hot vent gasses during a thermal runaway event, a housing enclosing the battery modules therein and defining perimeter vent openings, and a plurality of perimeter vent assemblies. Each vent assembly is connected adjacent a corresponding one of the vent openings, and includes a translatable member, a gas diffuser block, and at least one sacrificial post. The gas diffuser block is connected to an outer surface of the housing, covers a respective one of the vent openings, and defines a plurality of orifices. The at least one sacrificial post is configured to melt or incinerate at a predetermined temperature to cause the translatable member to translate relative to the diffuser block and thereby prevent the vent gasses from escaping the battery pack.

20 Claims, 4 Drawing Sheets

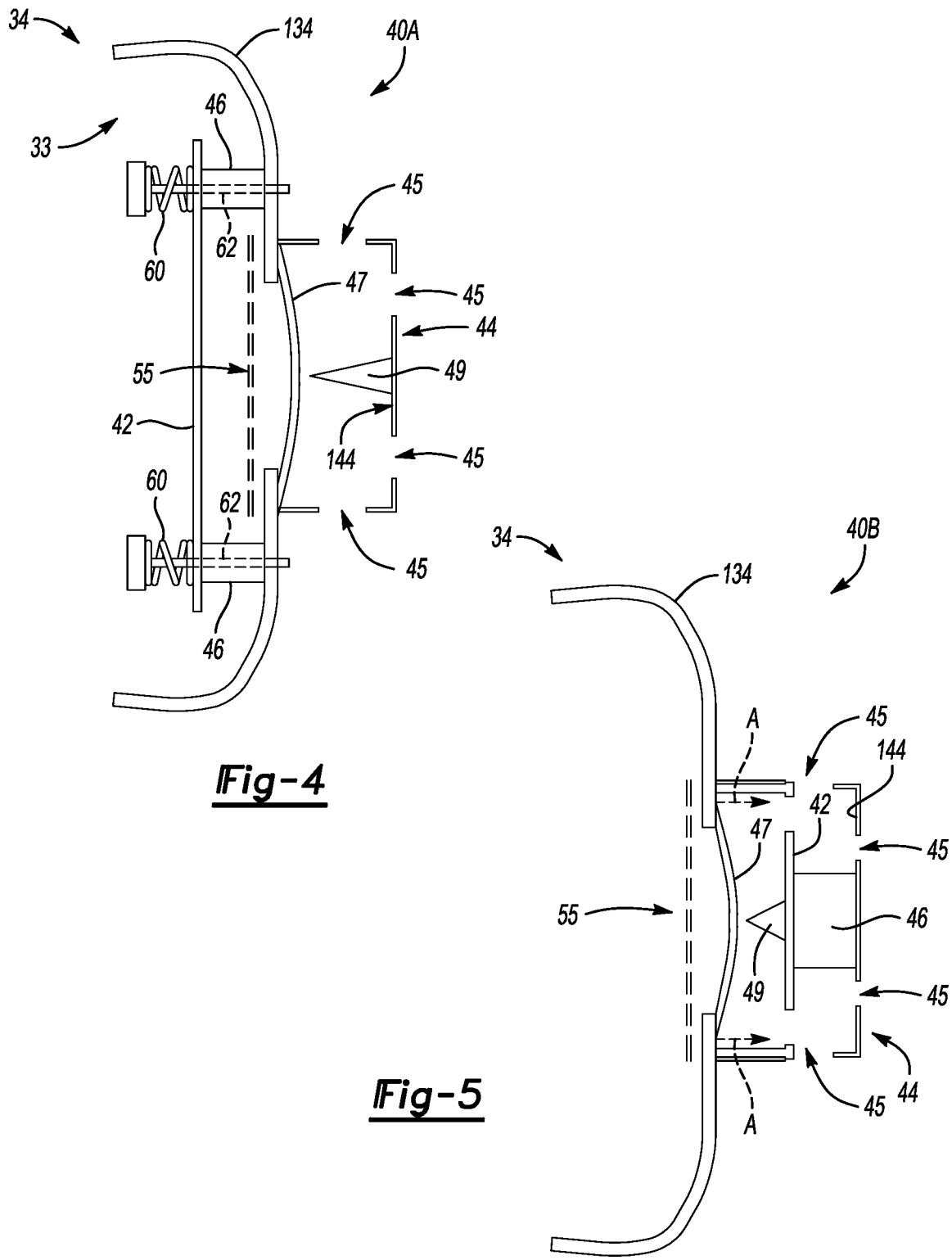

BATTERY PACK WITH TEMPERATURE-CONTROLLED VENT GAS FLOW

INTRODUCTION

Electrochemical battery packs serve as power supplies in a myriad of battery electric systems. Aboard an electric vehicle for example, a high-voltage propulsion battery pack is arranged on a direct current (DC) voltage bus, with the propulsion battery pack having an application-suitable number of cylindrical, prismatic, or pouch-style battery cells. The DC voltage bus ultimately powers one or more electric traction motors and associated power electronic components during battery discharging modes, and also conducts a charging current to constituent battery cells of the battery pack during battery charging modes.

Propulsion battery packs for use with electric vehicles and other battery electric systems commonly utilize a lithium-ion battery chemistry. In a lithium-ion battery cell, the movement of electrons and lithium ions produces electricity to energize the above-noted electric traction motor(s). However, the charging and discharging processes generate heat, which in turn must be dissipated from the battery cells. To that end, a propulsion battery pack may be cooled using battery coolant, cooling fins or other radiating structure, a cooling plate, or other suitable thermal regulation hardware. Under rare conditions, such as battery cell damage, age, or degradation, heat could continue to build at a rate exceeding the battery pack's cooling capability. Such a condition is referred to in the art as thermal runaway.

SUMMARY

Disclosed herein is an electrochemical battery pack having a housing defining a plurality of perimeter gas vent openings ("vents"). The perimeter vents contemplated herein are configured to release high-temperature vent gasses from the battery pack during the above-noted thermal runaway condition. The perimeter vents are equipped with membranes that burst at a predetermined pressure to release captive vent gasses to the surrounding atmosphere, as appreciated in the art. Additionally, each perimeter vent contemplated herein is equipped with a corresponding vent closure assembly allowing the perimeter vents to close at a threshold temperature. This occurs via melting, incineration, or another temperature-based failure of one or more sacrificial posts when the vent gasses reach or exceed the threshold temperature, e.g., about 400 degrees Celsius (° C.) to about 550° C. in a possible implementation.

As appreciated in the art, vent membranes of the type noted above are configured to burst when the battery pack's internal pressure exceeds about 20-25 kilopascals (kPa). Failure of a vent membrane in this manner allows captive vent gasses within the battery pack to be rapidly exhausted to the surrounding ambient. However, thermal runway in lithium-ion and other high-energy battery packs often corresponds to vent gas temperatures of well over 600° C. Such extreme temperatures could result in self-ignition of the vent gasses in the presence of oxygen, i.e., when the vent gasses are discharged to the ambient. It is therefore desirable to close off one or more of the perimeter vents at the threshold temperature, which is set well below the ignition temperature but still high enough to allow the perimeter vent to perform its intended venting function for as long as the vent gas temperature remains below the threshold temperature.

It is recognized herein that vent gas ignition during thermal runaway is prevalent near perimeter vents located in proximity to an initiating battery module, i.e., a particular battery module or section of the battery pack within which the thermal runway condition originates. The hardware solutions set forth below situationally and individually close off one or more of the perimeter vents when the vent gasses reach the threshold temperature after first opening the perimeter vents in response to an elevated pressure. Because each perimeter vent is individually equipped with a corresponding perimeter vent closure assembly configured to close in this manner, exhaust flow of the hot vent gasses through a given perimeter vent are selectively blocked while maintaining proper exhaust gas flow from the remaining open perimeter vents.

In particular, an aspect of the present disclosure includes a battery pack, e.g., a lithium-ion propulsion battery pack, with the battery pack having a housing enclosing one or more battery modules. The housing defines a plurality of perimeter vents. The battery pack also includes a plurality of vent closure assemblies. Each respective vent closure assembly is connected adjacent a corresponding one of the perimeter vents and includes a translatable member and diffuser block. The diffuser block is connected to an outer surface of the housing, spans a respective one of the perimeter vents, and defines a plurality of orifices. At least one sacrificial post is disposed within each vent closure assembly. The sacrificial posts contemplated herein are "sacrificial" in the sense of being configured to melt, incinerate, fragment, fracture, or otherwise disintegrate at a threshold temperature below the above-noted ignition temperature. Failure of the sacrificial post(s) in this manner causes the translatable member to translate relative to the diffuser block and thereby close off the perimeter vent or the orifices of the diffuser block in different implementations.

The housing in one or more embodiments may include side walls surrounding a battery cavity, with each of the side walls defining one or more of the perimeter vents. The one or more battery modules are enclosed within the battery cavity. Each respective one of the vent closure assemblies may also include a spark arrester plate arranged within the cavity, with such a plate being configured to prevent a discharge of molten or solid matter from the battery pack during thermal runaway.

In some embodiments, a respective one of the vent closure assemblies includes a membrane that is sealed around the respective one of the perimeter vents. The membrane is configured to inflate toward the diffuser block in response to increasing pressure within the cavity. In such a construction, a lancet or other sharpened implement positioned within an interior volume of the diffuser block is configured to puncture the membrane. This action occurs when the membrane reaches a predetermined inflation level, i.e., when the membrane inflates far enough to contact the lancet.

The lancet in accordance with one or more embodiments may be positioned on or attached to the translatable member within the interior volume of the diffuser block. Alternatively, the lancet may be connected to an interior surface of the diffuser block.

Aspects of the disclosure include two or more sacrificial posts configured as tubes or sleeves, i.e., cylindrical posts with an axial through-passage. The vent closure assemblies in such an embodiment may include a plurality of springs positioned between the translatable member and the perimeter vent, with the springs passing through the axial through-passage of the sacrificial posts to react against an inner surface of the housing. The two or more sacrificial posts are coaxially aligned with a corresponding one of the springs in such an embodiment.

The sacrificial post(s) may be optionally constructed of an engineered high-temperature plastic or a composite material, or alternatively of a suitable metal or alloy.

Also disclosed herein is an electrified powertrain system in which an electric machine is connectable to a load, e.g., one or more road wheels of a motor vehicle. The electrified powertrain system includes a power inverter connected to a battery pack and the electric machine, with the power inverter being configured to invert a direct current (DC) voltage from the battery pack into an alternating current (AC) voltage for powering the electric machine. The battery pack includes one or more battery modules, a housing enclosing the one or more battery modules and defining a plurality of perimeter vents, and a plurality of vent closure assemblies.

Each vent closure assembly in this embodiment is connected adjacent a corresponding one of the perimeter vents and includes a translatable member, a diffuser block, and at least one sacrificial post. The diffuser block is connected to an outer surface of the housing, spans a respective one of the perimeter vents, and defines a plurality of orifices. The at least one sacrificial post is configured to melt or incinerate at a predetermined temperature to cause the translatable member to translate relative to the housing and the diffuser block to thereby close off the perimeter vents or the plurality of orifices.

Another aspect of the disclosure includes a vent closure assembly for use with a perimeter vent of a housing of a battery pack. In one or more embodiments, the vent closure assembly includes a translatable member, a diffuser block connectable to an outer surface of the housing around the perimeter vent and defining a plurality of orifices, and one or more sacrificial posts. Each one of the sacrificial posts is configured to melt or incinerate at about 350° C. to about 550° C. to cause the translatable member to translate relative to the housing and thereby cause the diffuser block to close off the perimeter vent or the plurality of orifices.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 4 is a side view illustration of a perimeter vent for providing pressure and temperature-controlled vent gas flow of the battery pack shown in FIGS. 1 and 2.

FIG. 5 is a side view illustration of an alternative construction of the perimeter vent shown in FIG. 4.

Figure 1:
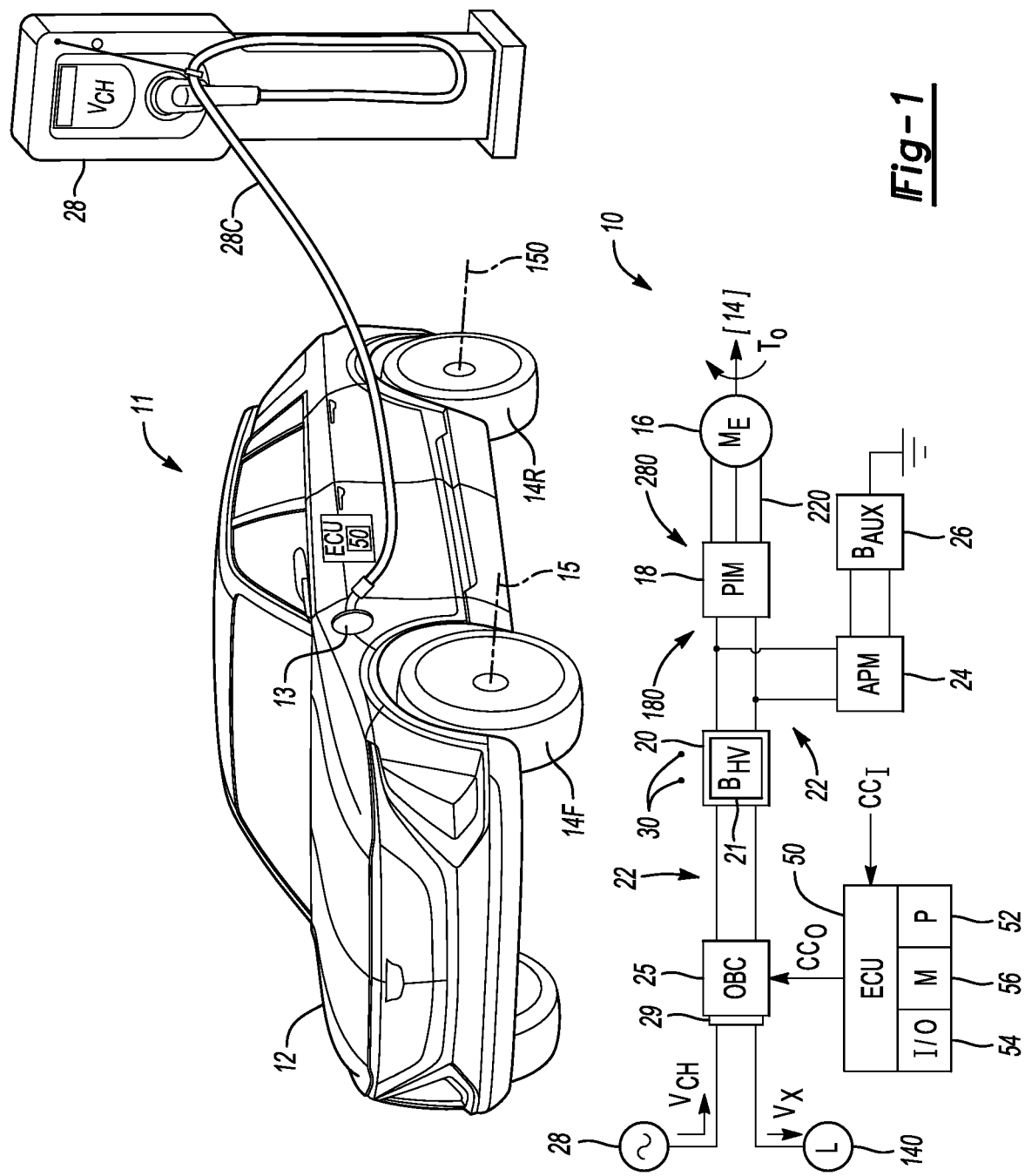
FIG. 1 is an exemplary electrified powertrain system equipped with a high-voltage battery pack having pressure and temperature-controlled vent gas flow as set forth herein.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, wherein like reference numbers refer to like features throughout the several views, FIG. 1 depicts an electrified powertrain system 10 having a high-voltage battery pack ($B_{HV}$) 20. The battery pack 20 includes a housing 21, e.g., an outer casing or cover, defining a plurality of perimeter vents 30, e.g., circular or rectangular through-openings each equipped with a vent closure assembly 40A or 40B of the type shown in FIGS. 4 and 5, respectively. That is, one of the vent closure assemblies 40A or 40B is connected adjacent to a corresponding one of the perimeter vents 30 of FIG. 1 such that each respective one of the perimeter vents 30 is individually closable in a passive manner during thermal runaway, i.e., without the involvement of an associated control system. Collectively, the vent closure assemblies 40A or 40B described in detail below help reduce the potential of vent gas self-ignition.

In a representative use case, the electrified powertrain system 10 may be used as part of a motor vehicle 11 or another mobile system. As shown, the motor vehicle 11 may be embodied as a battery electric vehicle, with the present teachings also being extendable to plug-in hybrid electric vehicles. Alternatively, the electrified powertrain system 10 may be used as part of another mobile system such as but not limited to a rail vehicle, aircraft, marine vessel, robot, farm equipment, etc. Likewise, the electrified powertrain system 10 may be stationary, such as in the case of a powerplant, hoist, drive belt, or conveyor system. Therefore, the electrified powertrain system 10 in the representative vehicular embodiment of FIG. 1 is intended to be illustrative of the present teachings and not limiting thereof.

The exemplary motor vehicle 11 shown in FIG. 1 includes a vehicle body 12 and road wheels 14F and 14R, with "F" and "R" indicating the respective front and rear positions. The road wheels 14F and 14R rotate about respective axes 15 and 150, with the road wheels 14F, the road wheels 14R, or both being powered by output torque (arrow $T_O$) from a rotary electric machine ($M_E$) 16 of the electrified powertrain system 10 as indicated by arrow [14]. The road wheels 14F an 14R thus represent a mechanical load in this embodiment, with other possible mechanical loads being possible in different host systems.

To that end, the electrified powertrain system 10 includes a power inverter module (PIM) 18 and the high-voltage battery pack 20, e.g., a multi-cell lithium-ion propulsion battery or a battery having another application-suitable chemistry, both of which are arranged on a high-voltage DC bus 22. As appreciated in the art, the PIM 18 is a semiconductor-based power inverter, and thus includes a DC side 180 and an alternating current (AC) side 280, with the latter being connected to individual phase windings (not shown) of the rotary electric machine 16 when the rotary electric machine 16 is configured as a polyphase rotary electric machine in the form of a propulsion motor as shown.

The battery pack 20 of FIG. 1 in turn is connected to the DC side 180 of the PIM 18, such that a battery voltage from the battery pack 20 is provided to the PIM 18 during propulsion modes of the motor vehicle 11. The PIM 18, or more precisely a set of semiconductor switches (not shown) residing therein, are controlled via pulse width modulation, pulse density modulation, or other suitable switching control techniques to invert a DC input voltage on the DC bus 22 into an AC output voltage suitable for energizing a high-voltage AC bus 220. High-speed switching of the resident semiconductor switches of the PIM 18 ultimately energizes the rotary electric machine 16 to cause the rotary electric machine 16 to deliver the output torque (arrow $T_O$) as a motor drive torque to one or more of the road wheels 14F and/or 14R in the illustrated embodiment of FIG. 1, or to another coupled mechanical load in other implementations.

Electrical components of the electrified powertrain system 10 may also include an accessory power module (APM) 24 and an auxiliary battery ($B_{AUX}$) 26. The APM 24 is configured as a DC-DC converter that is connected to the DC bus 22, as appreciated in the art. In operation, the APM 24 is capable, via internal switching and voltage transformation, of reducing a voltage level on the DC bus 22 to a lower level suitable for charging the auxiliary battery 26 and/or supplying low-voltage power to one or more accessories (not shown) such as lights, displays, etc. Thus, "high-voltage" refers to voltage levels well in excess of typical 12-15V low/auxiliary voltage levels, with 400V or more being an exemplary high-voltage level in some embodiments of the battery pack 20.

In some configurations, the electrified powertrain system 10 may include an on-board charger (OBC) 25 that is selectively connectable to an offboard charging station 28 via an input/output (I/O) block 29 during a charging mode during which the battery pack 20 is recharged by an AC charging voltage ($V_{CH}$) from the offboard charging station 28. The I/O block 29 is connectable to a charging port 13 on the vehicle body 12. For instance, a charging cable 28C may be connected to the charging port 13, e.g., via an SAEJ1772 connection. The electrified powertrain system 10 may also be configured to selectively receive a DC charging voltage in one or more embodiments as appreciated in the art, in which case the OBC 25 would be selectively bypassed using circuitry (not shown) that is not otherwise germane to the present disclosure. The OBC 25 could operate in different modes, including a charging mode during which the OBC 25 receives the AC charging voltage ($V_{CH}$) from the offboard charging station 28 to recharge the battery pack 20, and a discharging mode, represented by arrow V2X, during which the OBC 25 offloads power from the battery pack 20 to an external AC electrical load (L) 140. In this manner, the OBC 25 may be a bidirectional charger.

Still referring to FIG. 1, the electrified powertrain system 10 may also include an electronic control unit (ECU) 50. The ECU 50 is operable for regulating ongoing operation of the electrified powertrain system 10 via transmission of electronic control signals (arrow $CC_O$). The ECU 50 does so in response to electronic input signals (arrow $CC_I$). Such input signals (arrow $CC_I$) may be actively communicated or passively detected in different embodiments, such that the ECU 50 is operable for determining a particular mode of operation. In response, the ECU 50 controls operation of the electrified powertrain system 10.

To this end, the ECU 50 is equipped with one or more processors (P) 52, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s) 54, appropriate signal conditioning and buffer circuitry, and other components such as a high-speed clock to provide the described functionality. The ECU 50 also includes an associated computer-readable storage medium, i.e., memory (M) 56 inclusive of read only, programmable read only, random access, a hard drive, etc., whether resident, remote or a combination of both. Control routines are executed by the processor 52 to monitor relevant inputs from sensing devices and other networked control modules (not shown), and to execute control and diagnostic routines to govern operation of the electrified powertrain system 10.

Figure 2:
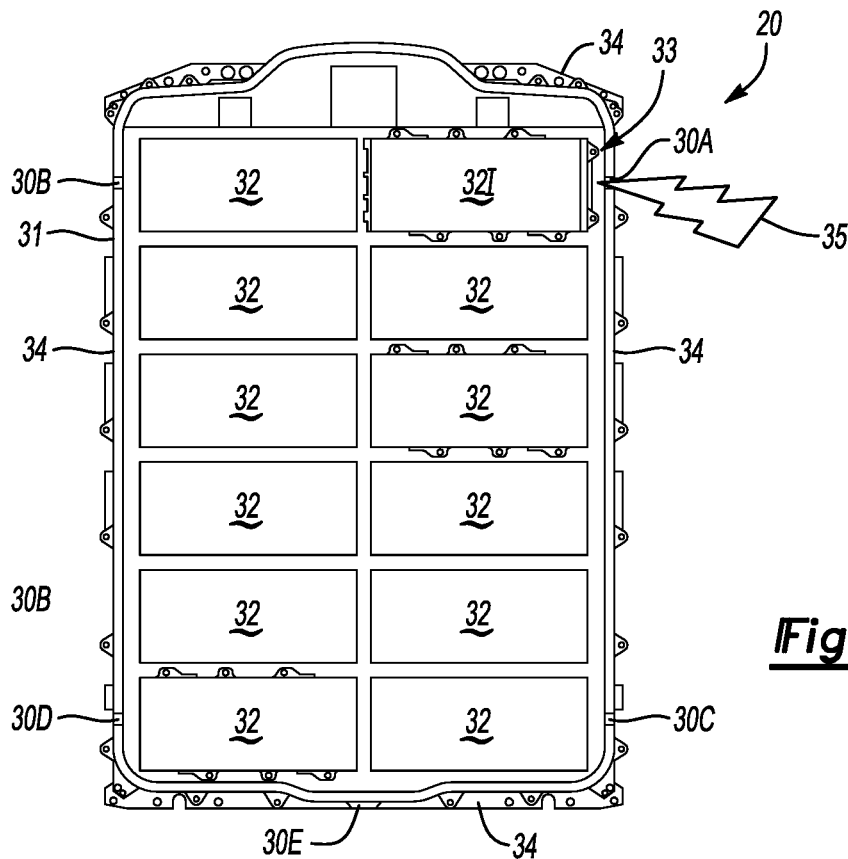
FIG. 2 is a plan view illustration of a representative embodiment of the battery pack shown in FIG. 1.

Referring to FIG. 2, the battery pack 20 includes a tray 31 connectable to the housing 21 of FIG. 1, with a portion of the housing 21 omitted from FIG. 2 for illustrative clarity. A plurality of battery modules 32 is disposed on the tray 31 and encapsulated within a battery cavity 33 when the housing 21 is fastened to the tray 31, as appreciated in the art. Although internal details of the battery modules 32 are omitted for illustrative simplicity, those skilled in the art will appreciate that the battery modules 32 contain therein an application-specific number of electrochemical battery cells, with a typical embodiment being pouch-style lithium-ion battery cells. A lithium-ion cell is generally composed of an electrolyte material, one or more pair of working electrodes, and a permeable separator, which are collectively enclosed inside an electrically-insulated pouch, can, or prismatic shell. Grouped battery cells may be connected in series or parallel through use of an electrical interconnect board and related buses, sensing hardware, and power electronics. While twelve battery modules 32 are depicted in FIG. 2, more or fewer battery modules 32 may be used in other configurations.

As noted above, the housing 21 of FIG. 1 is connectable to the tray 31 of FIG. 2 to enclose the battery modules 32 therebetween. The housing 21 includes side walls 34 at least partially surrounding the battery cavity 33. Each of the side walls 34 defines a respective one or more of the perimeter vents 30 of FIG. 1 therethrough, with the battery modules 32 securely enclosed within the battery cavity 33 and protected from dirt, moisture, and debris. The perimeter vents 30 described generally hereinabove with reference to FIG. 1 may include representative perimeter vents 30A, 30B, 30C, 30D, and 30E, such that each side wall 34 defines at least one of the perimeter vents 30. As with the particular number of battery modules 32 used in a given construction of the battery pack 20, the number and relative position of the perimeter vents 30 may vary with the intended application, and thus the five perimeter vents 30A, 30B, 30C, 30D, and 30E of FIG. 2 are non-limiting and illustrative of the present teachings.

During thermal runaway, the temperature within the battery cavity 33 will increase. As the temperature rises, the battery cells and other internal structure of the battery modules 32 may degrade and produce various gasses as a byproduct. For instance, an electrolyte solution of a typical lithium-ion cell includes a lithium salt dissolved in an organic solvent that decomposes during thermal runaway to produce carbon dioxide, carbon monoxide, and other combustion byproducts. As temperature rises within the battery cavity 33, so too does the internal pressure within the battery cavity 33. Thus, the perimeter vents 30A-30E are spaced apart from each other around a perimeter of the battery pack 20, with each of the perimeter vents 30A-30E being configured to open in response to a threshold pressure within the battery cavity 33 as noted above. As a result, vent gasses are discharged to the surrounding ambient, with a discharge of representative vent gasses 35 shown through the perimeter vent 30A in FIG. 2 for an initiating battery module 321.

Figure 3:
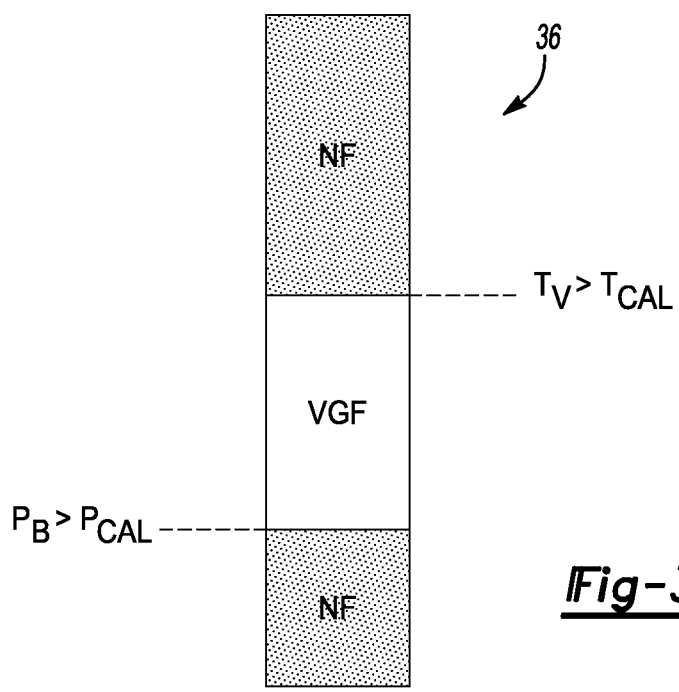
FIG. 3 is bar graph depicting stages of vent gas flow control in accordance with the disclosure.

Referring briefly to FIG. 3, a bar graph 36 illustrates the pressure and temperature-based operating principle of the vent closure assemblies 40A or 40B shown in FIGS. 4 and 5, respectively, as described in further detail below. Below a calibrated pressure ($P_{CAL}$) and a calibrated temperature ($T_{CAL}$), i.e., a predetermined pressure and temperature, the perimeter vents remain closed, which in turn corresponds to a no-flow ("NF") state. Absent thermal runaway within the battery pack 20 of FIGS. 1 and 2, pressures within the battery cavity 33 of FIG. 2 will be low, which ensures that the vent openings 30 remain closed. However, as pressures within the battery cavity 33 rise, the membrane or other pressure-activated structure disposed within each of the vent openings 30A-30E will eventually burst, thereby allowing hot vent gasses to flow through the corresponding vent opening 30A, 30B, 30C, 30D, or 30E to the surrounding ambient.

Vent gas flow (VGF) thus commences when the battery pressure ($P_B$) within the battery cavity 33 exceeds the calibrate pressure ($P_{CAL}$), i.e., "$P_B > P_{CAL}$". Although the calibrated pressure ($P_{CAL}$) may vary with the intended application, about 20 kPA to about 25 kPA is typical. Should vent gas temperature ($T_V$) continue to rise and eventually exceed the calibrated temperature ($T_{CAL}$), i.e., "$T_V > T_{CAL}$", this will result in a passive activation of the vent closure assemblies 40A or 40B of FIGS. 4 and 5, respectively, thereby transitioning the affected perimeter vent 30 back to its no-flow ("NF") state.

As shown in FIG. 4, the vent closure assembly 40A in a possible construction includes a translatable member 42 such as a temperature-resistant steel or other metal plate, and a diffuser block 44 connected to an outer surface 134 of the side wall 34. The diffuser block 44, which itself may be constructed of perforated high-temperature steel, spans a respective one of the perimeter vents 30 and defines a plurality of orifices 45. Additionally, the vent closure assembly 40A includes at least one sacrificial post 46 configured to melt or incinerate at a predetermined temperature to thereby cause the translatable member 42 to translate toward the diffuser block 44 to thereby close off the perimeter vent 30 in this embodiment. Each respective one of the vent closure assemblies 40A used in the battery pack 20 of FIGS. 1 and 2 may optionally include a spark arrester plate 55 arranged within the battery cavity 33. The spark arrester plate 55 as the name implies may be a perforated metal sheet or other suitable gas-permeable configured to prevent a discharge of sparks, particulate, or other solid or molten matter through the perimeter vent 30 during thermal runaway.

As appreciated in the art, each one of the vent closure assemblies 40A of FIGS. 4 and includes a membrane 47 sealed around the respective one of the perimeter vents 30 and configured to inflate toward the diffuser block 44 in response to an increasing pressure within the battery cavity 33. A lancet 49 is positioned within an interior volume of the diffuser block 44, with the lancet 49 being configured to puncture the membrane 47 when the membrane 47 reaches a predetermined inflation level, i.e., when the membrane 47 contacts a tip of the lancet 49. The lancet 49 for its part may be connected to an interior surface 144 of the diffuser block 44 as shown in FIG. 4, or the lancet 49 may be positioned on or attached to the translatable member 42 within the interior volume of the diffuser block 44 as shown in FIG. 5.

The representative embodiment of the vent closure assembly 40A shown in FIG. 4 includes two or more of the sacrificial posts 46 and a plurality of springs 60, in this instance embodied as coil springs. The sacrificial posts 46 and the springs 60 are positioned between the translatable member 42, e.g., a spring-loaded metal plate, and the corresponding perimeter vent with the springs 60 passing through an axial through-passage 62 of the sacrificial posts 46 to react against the side wall 34. The sacrificial posts 46 in this particular embodiment are coaxially-aligned with a corresponding one of the springs 60.

In a possible implementation, the sacrificial posts 46 may be constructed of an engineered plastic, composite material, or a metal or metal alloy configured to melt at the above-noted calibrated temperature ($T_{CAL}$). The calibrated temperature ($T_{CAL}$) is application-dependent and thus may vary based on factors such as the construction of the battery pack 20, its constituent battery chemistry, etc. Exemplary ranges for the calibrated temperature ($T_{CAL}$) includes about 400° C. to about 550° C., or about 450° C. to about 525° C., or about 475° C. to about 500° C., with 500° C. used herein for the purposes of illustration. In general, the calibrated temperature ($T_{CAL}$) should be substantially less than the ignition temperature of about 600° C., e.g., less than about 575° C. Exemplary metals or alloys include but are not limited to tellurium, alloys of aluminum including aluminum-calcium and aluminum-copper, gold-cadmium, and magnesium-nickel. An exemplary thermoplastics for certain implementations include polyetheretherketone (PEEK), Kevlar®, etc.

As an alternative construction, the vent closure assembly 40B shown in FIG. 5 includes a sacrificial post 46 disposed within the interior volume of the diffuser block 44. In the illustrated position, the sacrificial post 46 is disposed between the translatable member 42, in this exemplary instance perforated cylindrical disc or plate, and the interior surface 144 of the diffuser block 44. Melting/failure of the sacrificial post 46 in this particular embodiment causes the translatable member 42 to translate toward the diffuser block 44, as indicated by arrows A, which has the effect of blocking vent gasses from passing through the plurality of orifices 45. As noted above, the lancet 49 in this representative configuration is positioned on or attached to the translatable member 42 within the interior volume of the diffuser block 44.

Figure 6:
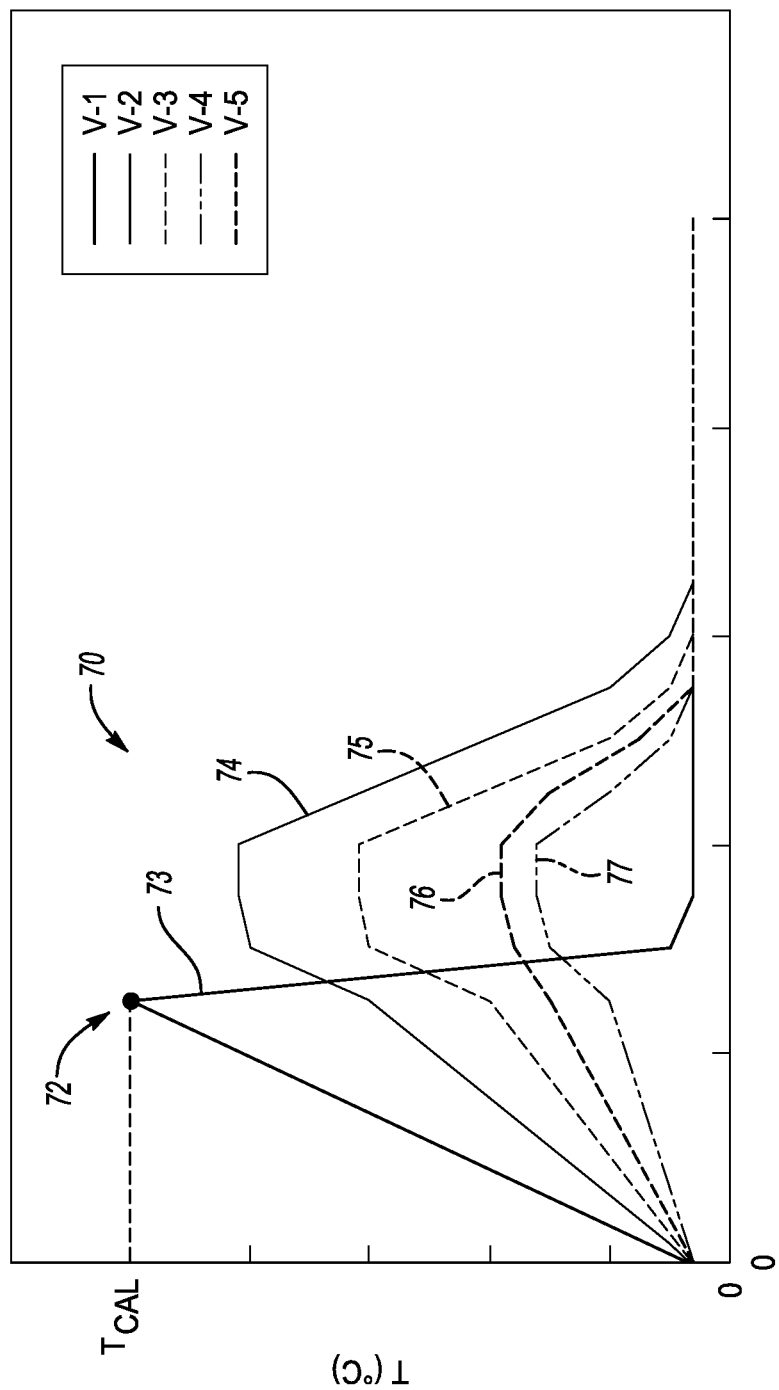
FIG. 6 is a plot of expected gas flow temperatures for a representative embodiment of the battery pack described herein.

Referring now to FIG. 6, a representative time plot 70 depicts vent gas temperatures ($T_V$) in degrees Celsius (° C.) on the vertical axis and time (t) in seconds (s) on the horizontal axis. Traces V-1, V-2, V-3, V-4, and V-5 correspond to the representative perimeter vents 30A, 30B, 30D, and 30E of FIG. 2 as described above. The time plot 70 illustrates expected vent flow temperatures for an exemplary scenario in which the perimeter vent 30A of FIG. 2 is closed by operation of one of the vent closure assemblies 40A or 40B of FIG. 4 or 5, respectively, at the calibrated temperature ($T_{CAL}$). This occurs at point 72 in FIG. 2, e.g., at between about 350° C. and about 550° C.

As shown in FIG. 2, the perimeter vent 30A is located proximate the initiating module 321. The trajectory of trace 73 (V-1) in FIG. 6 without closing the perimeter vent 30A could result in a temperature exceeding about 600° C., and possible ignition of the vent gasses. By automatically closing the perimeter vent 30A at the lower threshold temperature ($T_{CAL}$), gases are forced to flow out of remaining (and still open) perimeter vents 30B, 30C, 30D, and 30E. As perimeter vents 30B, 30C, 30D, and 30E are farther away from initiation Module 321, hot gases cool down before exiting battery pack. the expected gas flow temperatures of the remaining (and still open) perimeter vents 30B, 30C, 30D, and 30E may continue to rise, as indicated by respective traces 73, 74, 75, 76, and 77 of FIG. 6, but is expected to be below 600 C. After initial increase, gas flow temperatures of the remaining (and still open) perimeter vents 30B, 30D, and 30E is expected to plateau shortly after and drops back to zero as the thermal runaway condition abates. Thus, the present solutions may be utilized to individually close one or more of the various perimeter vents 30A-30E of FIG. 2 after their pressure-based opening for optimized vent gas flow control during a thermal runaway condition.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A battery pack comprising:
one or more battery modules;
a housing enclosing the one or more battery modules therein and defining a plurality of perimeter vents; and
a plurality of vent closure assemblies, each respective one of the vent closure assemblies being connected adjacent a corresponding one of the perimeter vents and comprising:
a translatable member;
a diffuser block connected to an outer surface of the housing, spanning the corresponding perimeter vent, and defining a plurality of orifices; and
at least one sacrificial post configured to melt or incinerate at a calibrated temperature to cause the translatable member to translate relative to the diffuser block and thereby close off the perimeter vents or the plurality of orifices.

2. The battery pack of claim 1, wherein the housing includes side walls surrounding a battery cavity, each of the side walls defining a respective one or more of the perimeter vents, wherein the one or more battery modules are enclosed within the battery cavity.

3. The battery pack of claim 2, wherein each respective one of the plurality of vent closure assemblies includes a spark arrester plate arranged within the battery cavity.

4. The battery pack of claim 1, wherein each respective one of the vent closure assemblies includes:
a membrane sealed around the corresponding one of the perimeter vents and configured to inflate toward the diffuser block in response to an increasing pressure within the housing; and
a lancet positioned within an interior volume of the diffuser block and configured to puncture the membrane when the membrane reaches a predetermined inflation level.

5. The battery pack of claim 4, wherein the lancet is positioned on or attached to the translatable member within the interior volume of the diffuser block.

6. The battery pack of claim 4, wherein the lancet is connected to an interior surface of the diffuser block.

7. The battery pack of claim 6, wherein the sacrificial post includes two or more sacrificial posts, the plurality of vent closure assemblies each comprising a plurality of springs positioned between the translatable member and the corresponding one of the perimeter vents, and wherein the two or more sacrificial posts are coaxially aligned with a corresponding one of the plurality of springs.

8. The battery pack of claim 1, wherein the sacrificial post is constructed of metal or a metal alloy.

9. The battery pack of claim 1, wherein the predetermined temperature is at least about 350° Celsius and less than about 550° Celsius.

10. The battery pack of claim 1, wherein the battery pack is a lithium-ion propulsion battery pack.

11. An electrified powertrain system comprising:
a rotary electric machine connectable to a load;
a battery pack;
a power inverter connected to the battery pack and the electric machine, and configured to invert a direct current (DC) voltage from the battery pack into an alternating current (AC) voltage for powering the rotary electric machine, wherein the battery pack includes:
one or more battery modules;
a housing enclosing the one or more battery modules therein and defining a plurality of perimeter vents; and
a plurality of vent closure assemblies each connected adjacent a corresponding one of the perimeter vents and comprising:
a translatable member;
a diffuser block connected to an outer surface of the housing, spanning a respective one of the perimeter vents, and defining a plurality of orifices; and
at least one sacrificial post configured to melt or incinerate at a predetermined temperature to cause the translatable member to translate relative to the housing and the diffuser block to thereby close off the perimeter vents or the plurality of orifices.

12. The electrified powertrain system of claim 11, wherein the rotary electric machine is a propulsion motor for a motor vehicle having one or more road wheels, and wherein the load includes the one or more road wheels.

13. The electrified powertrain system of claim 11, wherein the housing includes side walls surrounding a battery cavity, each of the side walls defining a respective one or more of the perimeter vents therethrough, wherein the one or more battery modules are enclosed within the battery cavity.

14. The electrified powertrain system of claim 11, wherein each respective one of the plurality of vent closure assemblies includes:
- a perforated spark arrester plate arranged within the battery cavity;
- a membrane sealed around the respective one of the perimeter vents and configured to inflate toward the diffuser block in response to an increasing pressure within the battery cavity; and
- a lancet positioned within an interior volume of the diffuser block and configured to puncture the membrane when the membrane reaches a predetermined inflation level.

15. The electrified powertrain system of claim 14, wherein the lancet is positioned on or attached to the translatable member within the interior volume of the diffuser block.

16. The electrified powertrain system of claim 14, wherein the lancet is connected to an interior surface of the diffuser block.

17. The electrified powertrain system of claim 11, wherein the sacrificial post includes two or more sacrificial posts, the plurality of vent closure assemblies each comprising a plurality of springs positioned between the translatable member and the corresponding one of the perimeter vents, and wherein the two or more sacrificial posts are coaxially aligned with a corresponding one of the plurality of springs.

18. A vent closure assembly for use with a perimeter vent of a housing of a battery pack, comprising:
- a translatable member;
- a diffuser block connectable to an outer surface of the housing around the perimeter vent and defining a plurality of orifices; and
- one or more sacrificial posts configured to melt or incinerate at about 350 degrees Celsius to about 550 degrees Celsius to cause the translatable member to translate relative to the housing and thereby cause the diffuser block to close off the perimeter vent or the plurality of orifices.

19. The vent closure assembly of claim 18, further comprising a spark arrester plate.

20. The vent closure assembly of claim 18, further comprising:
- a membrane sealable around the perimeter vent and configured to inflate toward the diffuser block in response to an increasing pressure within the housing; and
- a lancet positioned within an interior volume of the diffuser block and configured to puncture the membrane when the membrane reaches a predetermined inflation level.

* * * * *